United States Patent [19]

Janik

[11] Patent Number: 5,312,546

[45] Date of Patent: May 17, 1994

[54] DRY CHANGE FUEL FILTER SYSTEM

[75] Inventor: Leon P. Janik, Suffield, Conn.

[73] Assignee: Stanadyne Automotive Corp., Windsor, Conn.

[21] Appl. No.: 105,210

[22] Filed: Aug. 10, 1993

Related U.S. Application Data

[63] Continuation of Ser. No. 745,871, Aug. 16, 1991, abandoned.

[51] Int. Cl.⁵ .............................................. B01D 35/31
[52] U.S. Cl. ..................................... 210/248; 210/438; 210/440
[58] Field of Search ............... 210/232, 248, 437, 438, 210/440, 441

[56] References Cited

U.S. PATENT DOCUMENTS

| | | | |
|---|---|---|---|
| 2,468,862 | 5/1949 | Briggs | 210/493.2 |
| 3,931,015 | 1/1976 | Jenkins | 210/232 |
| 4,502,956 | 3/1985 | Wilson et al. | 210/248 |
| 5,017,285 | 5/1991 | Janik et al. | 210/438 |
| 5,084,170 | 1/1992 | Jawik et al. | 210/493.2 |

FOREIGN PATENT DOCUMENTS

| | | |
|---|---|---|
| 0323701 | 7/1989 | European Pat. Off. |
| 0405447 | 1/1991 | European Pat. Off. |

*Primary Examiner*—Matthew O. Savage
*Attorney, Agent, or Firm*—Chilton, Alix & Van Kirk

[57] ABSTRACT

A fuel filter assembly of a type wherein a disposable cartridge element is suspended below a base is adapted so that cartridge replacement may be accomplished in a dry or spill-free fashion. A plug is dimensioned and positioned within the base and extends into the mounted cartridge to occupy a pre-established cartridge volume. When the cartridge is axially dismounted from the base, the cartridge essentially gains free volume. The free volume gain allows for the cartridge to capture any fuel which may drain from the base.

17 Claims, 2 Drawing Sheets

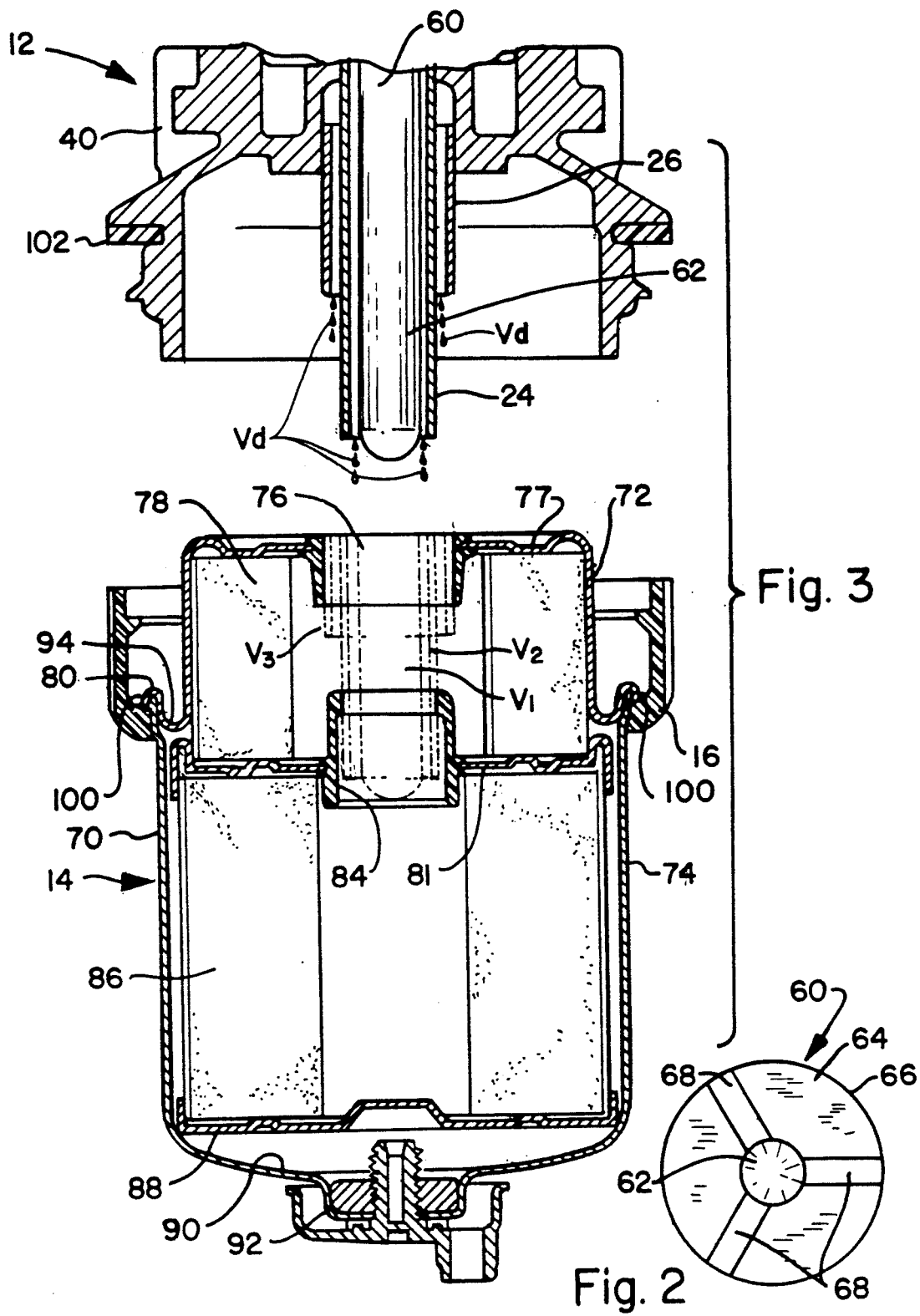

DRY CHANGE FUEL FILTER SYSTEM

This is a continuation of co-pending application Ser. No. 07/745,871 filed on Aug. 16, 1991, now abandoned.

BACKGROUND OF THE INVENTION

This invention relates generally to devices for filtering and separating liquids. More particularly, the present invention relates to fuel filters for removing foreign particles and separating water from fuel of the fuel supply system of an internal combustion engine.

The absence of high standards of quality control in diesel fuel supplies dictates that an effective fuel filter be incorporated into the fuel supply system of a diesel engine. It is not uncommon for diesel fuel to have significant quantities of abrasive particles and water. The abrasive particles present the potential for permanent damage to components of the fuel injection pump. The abrasive particles can also adversely affect the performance of the pump by destroying the ability of the fuel injection pump to precisely meter and deliver fuel at high pressures. The presence of water in the diesel fuel supply can cause corrosion of engine components, and during freezing conditions, can result in interruption of the fuel injection system and/or seizure of moving components.

Commonly, fuel filters employ a disposable filter cartridge which is replaced at pre-established intervals of filter usage. There are a wide variety of fuel filter configurations and orientations. In some fuel filter configurations, the disposable cartridge is suspended directly below the base in an inverted disposition which is referred to herein as an inverted fuel filter. While an inverted fuel filter satisfies a number of functional and dimensional constraints for certain applications, a common deficiency of a number of fuel filters, particularly those inverted fuel filters wherein the disposable cartridge is suspended below the base, is that during the replacement process significant quantities of fuel may discharge from the base and spill into the immediate environment. The fuel spillage is undesirable in terms of safety, potential environmental pollution and technican safety and hygiene. The spillage may also result in clean-up and disposal costs.

In U.S. Pat. No. 5,017,285, which is assigned to the assignee of the present invention, one disclosed inverted fuel filter assembly employs a base and a disposable filter cartridge which is suspended directly below the filter base. The cartridge includes a dual stage filter system wherein the fuel flows axially to a primary filter element for removing particulate matter and coalescing water droplets and axially to a second filter stage which functions as a water barrier. The filtered fuel flows generally axially back to the base and exits through an outlet passage in the base. The cartridge is retained on the base by a threaded collar which engages against a roll seam structure at the periphery of the cartridge housing. The base further includes a pair of concentric axial conduits or sleeves which seal with sealing grommets of the disposable cartridge and essentially function as inlet and outlet conduits between the base and the disposable cartridge. In one embodiment, the coalesced water is collected in the bottom of the cartridge and removed via a drain cock.

SUMMARY OF THE INVENTION

Briefly stated, the invention in a preferred form is a fuel filter assembly of an inverted type wherein a disposable filter cartridge is suspended below the base. The inverted fuel filter incorporates improvements so that upon replacement of the cartridge, excess fuel within the base is effectively captured by the cartridge and fuel leakage or spillage is effectively eliminated.

In one embodiment, the base has an inlet and an outlet and first and second axial conduits which provide fluid communication between the base and the disposable filter cartridge. A plug is positioned in the base and extends into the first conduit. The disposable filter cartridge is suspended from the base and is sealable with the first and second axial conduits which are partially received in the cartridge. The cartridge may include one or more filter elements for filtering fuel. The fuel path through the cartridge traverses through the first conduit, the filter elements and the second conduit. A retainer element is employed for locking the cartridge to the base. The plug occupies a pre-established volume of the cartridge when the cartridge is mounted to the base. When the cartridge is axially dismounted from the base for replacement, the volume of fuel which discharges from the base under gravitational force is less than the pre-established volume. The fuel discharged from the base essentially traverses the axial conduits and is captured in the disposable cartridge since the cartridge gains free volume upon replacement or dismounting due to the removal of a portion of the plug. A fluid retaining annulus may be provided at the upper end of the cartridge at various locations to facilitate cartridge retention of the discharged fuel.

The plug may be a one piece element having a base with multiple substantially radial slotted passages and an axial shaft which extends substantially the length of the first conduit. The upper portion of the plug may be retained in a cavity which is defined by an upper threaded cap of the base. Alternately, the volume plug structure may be provided by relatively thick wall structures of the axial conduits which provide fuel communication between the base and the cartridge.

An object of the invention is to provide a new and improved dry change fuel filter assembly.

Another object of the invention is to provide a new and improved fuel filter assembly wherein excess fuel dischargeable from the base during replacement is captured by the disposable filter cartridge.

A further object of the invention is to provide a new and improved inverted fuel filter assembly having an efficient and inexpensive configuration which substantially eliminates fuel spillage during replacement of the disposable filter cartridge.

Other objects and advantages of the invention will become apparent from the drawings and the specification.

BRIEF DESCRIPTION OF THE DRAWINGS

FIG. 2 is a bottom view of a volume plug employed in the filter system of FIG. 1; and FIG. 3 is a fragmentary sectional view, partly in schematic, of the fuel filter system of FIG. 1 in a dismounted configuration further illustrating the principle of operation thereof.

DETAILED DESCRIPTION OF THE PREFERRED EMBODIMENT

Figure 1:
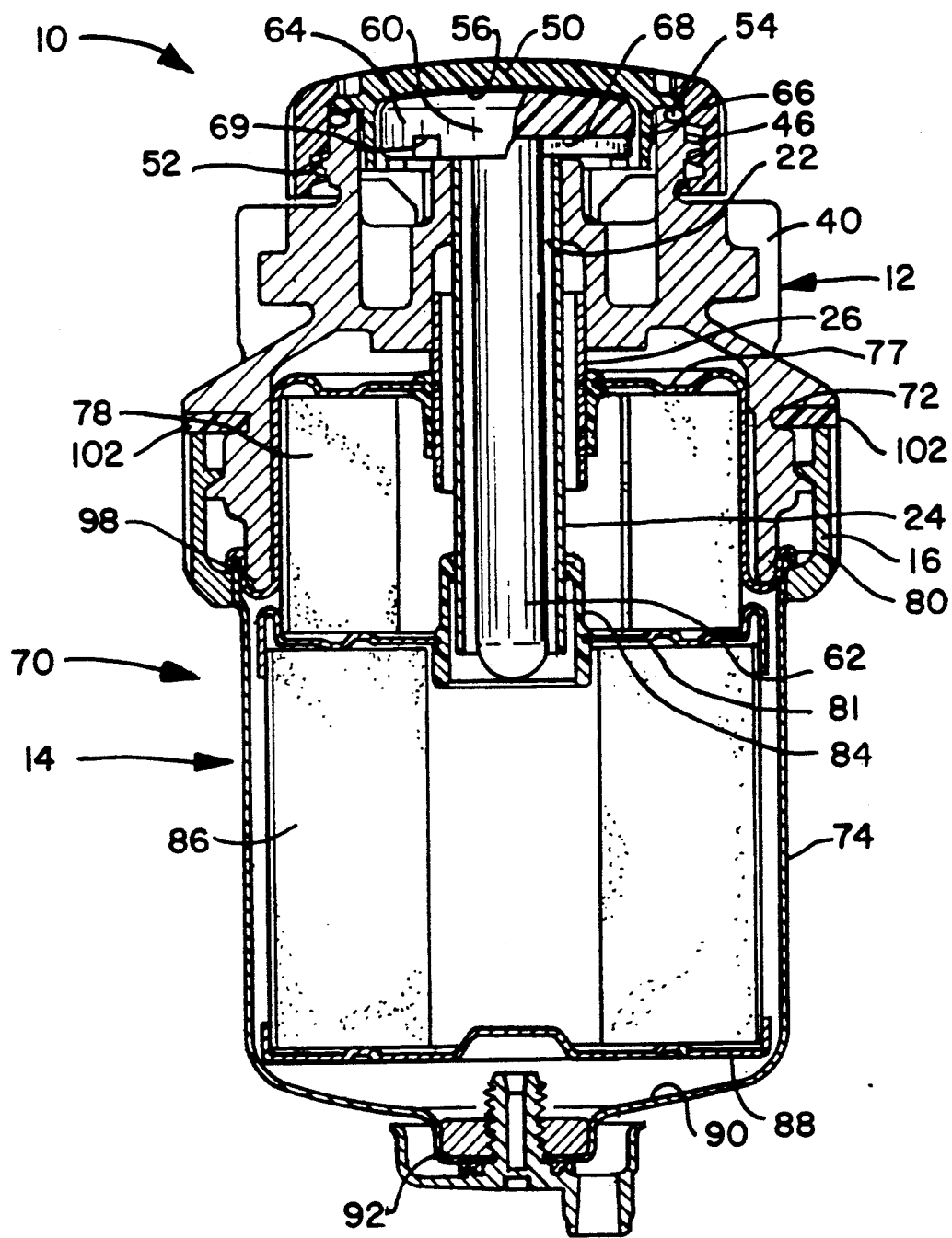
FIG. 1 is an elevated sectional view of a dry change fuel filter system in accordance with the present invention.

With reference to the drawings wherein like numerals represent like parts throughout the several figures, a fuel filter assembly in accordance with the present invention is generally designated by the numeral 10. Fuel filter assembly 10 comprises a base 12 and a disposable filter cartridge 14. The fuel filter assembly is especially adapted for incorporation into the fuel supply system of an internal combustion engine (not illustrated), such as a diesel engine, for removing particulate matter from the fuel and for separating water from the fuel. The base 12 is fixedly mounted to the engine header or other fixed position of the vehicle. The base is disposed generally above the disposable filter cartridge 14 which is secured to the base by means of a retainer collar 16.

The base 12 forms an inverted cup-like receptacle which defines a lower receiving cavity for the upper portions of the disposable cartridge. A central stepped axial bore 22 in the base closely receives an elongated sleeve-like conduit 24 and an outer concentric sleeve-like conduit 26 of reduced length. The conduits 24 and 26 provide generally co-axial fluid communication between the base and the disposable cartridge. An inlet passage (not illustrated) is formed at an upper side location of the base to provide fluid communication through the passageway defined by the first conduit 24. An outlet passage (not illustrated) is also formed at an upper opposing side portion of the base to provide external fluid communication from the axial fluid conduit defined between the first and second conduits 24 and 26. An integral projecting bracket 40 for anchoring the filter base to the engine header projects transversely from the base. The bracket has a pair of openings (not illustrated) through which fasteners are inserted.

An upper portion of the base has a circumferential threaded surface 46. An endcap 50 includes an interior threaded surface 52 which is complementary with the surface 46 and is threadably securable thereon. The endcap threadably seals to the base body by means of a seal ring 54 to provide a fluid tight connection with respect to an upper cavity 56 of the base.

A plug 60 is inserted into the cavity and positioned so as to partially protrude downwardly into the first conduit 24. The plug is retained in position by means of the endcap 50 and the walls defining the cavity. The plug has an axially projecting column 62 with a closed or solid distal end. The distal end portion of the column is dimensioned to occupy a pre-established volume as will be detailed below. A circumferential shoulder 64 projects radially at the top of the column and occupies a substantial portion of the cavity 56. The shoulder 64 is defined by a peripheral circular rim 66 which engages the cavity defining walls to center the plug so that the projecting column 62 of the plug extends generally coaxially in the first conduit 24. The diameter of the column 62 is less than the diameter of the first axial conduit 24 to permit fluid communication between the base and the cartridge. The plug column 62 may extend the entire length of the conduit and project slightly beyond the lower terminus thereof. The plug may be formed of plastic or other suitable material and may have a solid or hollow core. At the upper underside portion of the shoulder, radial grooves or recesses 68 extend from an annular recess 69 encircling the column to allow for the fuel communication from the inlet passage to the first conduit 24. The annular recess 69 is optional.

The disposable filter cartridge 14 comprises a can-like container 70 which is formed by a pair of lower and upper cup-like metal sections 72 and 74 which are joined along a circumferential roll seam 80. The truncated upper section 72 is a molded member which includes a central axial opening. A sealing grommet 76 mounted at the opening having an aperture that diametrally seals against the outer conduit 26. The top surface of container section 72 is contoured to form a generally annular fluid retaining recess 77.

A secondary filter element 78 which has a continuous fan-shaped pleated configuration is housed within the upper section. The lower end of the secondary element 78 is engaged by a medial plate 81 which has a central opening. A second sealing grommet 84 mounted at the plate opening diametrally seals against the first conduit 24. The primary filter element 86 which also has a continuous fan-like configuration engages the underside of the medial plate. The medial plate has a peripheral compound bend which forms a pair of engagement structures for the filters 78 and 86. The lower portion of the primary element is retained by a lower plate 88 having an upturned peripheral flange. The primary element is housed in the lower section 74. A sump 90 is formed at the bottom of the lower section to collect water which coalesces from the fuel. A drain cock 92 is disposed in the lower portion of the cartridge for draining the water.

The cartridge includes an annular recess 94. The annular recess 94 is located inwardly adjacent the roll seam 80. The recess defines one or more slots for receiving complementary keys 98 projecting from the end of the base. The threaded retainer collar 16 includes a rim-like shoulder 100 for retentively engaging the roll seam 80. The collar threads to the base for securing the disposable cartridge to the base. A dust seal 102 may be interposed between the upper end of the retainer collar and an annular sealing shoulder of the base. Both the fluid retaining recess 77 and the annular recess 94 function to collect and retain fuel when the filter cartridge is removed for replacement. As best illustrated in FIG. 1, the fluid retaining annular recess 77 surrounds conduits 22 and 26 and annular recess 94 surrounds conduit 22 when the cartridge is mounted to the base.

With reference to FIG. 3, when the disposable filter cartridge is locked to the base, the plug occupies a volume V1 within the disposable cartridge 14. In addition, the conduits 24 and 26 occupy smaller volumes V2 and V3, respectively. As the cartridge is axially dismounted from the base, the cartridge essentially gains free volume $VF = V1 + V2 + V3$ due to the absence of the plug portion volume V1 and conduit portion volumes V2 and V3. As the cartridge is axially dismounted, the fuel which remains in the base drains through conduits 24 and/or 26 into the cartridge container and is essentially captured thereby. Plug 60 is preferably dimensioned so that during cartridge replacement, the volume of free fuel which discharges from the base under the force of gravity, designated schematically by Vd, is less than volume V1 and naturally less than the composite free volume VF. The annuli 77 and 94 may also aid to retain the draining fuel. Consequently, replacement or dismounting of the disposable cartridge from the base can be accomplished in essentially a dry change fashion with all of the fuel draining from the base being efficiently captured by the removed disposable cartridge.

It will be appreciated that the plug 60 may assume a wide variety of configurations which essentially implement a negative volume when the cartridge is mounted to the base. In an alternative embodiment (not illustrated in accurate dimensional relationship to the other filter assembly components), the conduit 24 may have a considerably increased wall thickness or includes a liner which occupies a significant volume within the cartridge when the cartridge is mounted to the base. The volume plug may thus essentially comprise the modified axial conduit. In addition, conduit 26 may be modified to have a significantly greater wall thickness. As a rule, the flow area through conduit 24 is preferably less than or equal to the uniform, cross-sectional area of the conduit walls and/or plug portions which are received in the cartridge when the cartridge is mounted to the base. For embodiments wherein the wall thicknesses of conduits 24 and 26 are suitably increased in lieu of the central axial volume plug to provide the axial volume plug, $Vf=V2+V3$ and the volume of the interior passage formed by conduit 24 and disposed in the cartridge is less than or equal to $V2+V3$. The negative free volume $Vf$ is accordingly preferably greater than the volume of the fuel $Vd$ in the base which may drain or discharge under the ordinary gravitational force.

The plug is preferably formed of plastic or other suitable materials and is dimensioned to allow for the efficient passage of the fuel into the cartridge The plug is also preferably dimensioned to provide self-centering or self-positioning within the base. In the illustrated embodiment, the plug may essentially be inserted through the upper cavity and secured by means of the removeable endcap which is employed to mount an optional heating element.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fuel filter assembly comprising:
   base means defining a central axis and comprising an inlet and an outlet, and first and second conduits in fluid communication with said inlet and outlet, respectively, and extending in generally axial relationship with said axis, said base means comprising plug means extending into said first conduit, and cap means engageable against said plug means for retaining said plug means with said base means, said plug means being formed of non-metallic material;
   imperforate container means suspended from said base means and including aperture means for receiving said first and second conduits to provide fluid communication with said base means via said first and second conduits, said container means having filtering means enclosed therein for filtering fuel which traverses a flow path through said filtering means from said first conduit, a pre-established volume of said plug means being disposed in said container means when said container means is mounted to said base means, and
   retainer means for lockably securing said container means to said base means,
   so that when said retainer means is unlocked and said container means is axially dismounted from said base means, fuel dischargeable from said base means through said conduits under the force of gravity is capturable in said container means.

2. The fuel filter assembly of claim 1 wherein said plug means comprises a positioning shoulder received by said base means and a column projecting from said positioning shoulder and at least partially extending into said first conduit.

3. The fuel filter assembly of claim 2 wherein said positioning shoulder has a first side and an opposing second side from which said column projects, and said second side defines at least one generally radial groove in fluid communication with said inlet and extending relative to said column to provide fluid communication between said column and the radial periphery of said positioning shoulder.

4. The fuel filter assembly of claim 3 wherein there are three equiangularly spaced grooves.

5. The fuel filter assembly of claim 1 further comprising positioning means for positioning said column in generally coaxial relationship with said first conduit.

6. The fuel filter assembly of claim 1 wherein said plug means defines a recess which forms a passageway between said inlet and said first conduit.

7. The fuel filter assembly of claim 1 wherein said cap means further comprises a cap threadably mountable to said base means, said cap partially defining a cavity, and said plug means partially occupies said cavity.

8. The fuel filter assembly of claim 1 wherein said container means comprises a housing having an end portion having a first surface generally facing said base, said end portion configured to define a generally annular first retaining recess axially recessed relative to said first surface and surrounding said aperture means and positionable to surround said first and second conduits when said cartridge means is mounted to said base means.

9. The fuel filter assembly of claim 8 further comprising a second retaining recess positionable to surround said first retaining recess when said cartridge means is mounted to said base means.

10. A fuel filter assembly comprising:
    base means having an axis, an inlet and an outlet and comprising cavity defining means for defining a cavity in fluid communication with said inlet, said cavity defining means having a support surface, said base means comprising first and second conduit means in fluid communication with said cavity for providing generally axial fluid communication with said inlet and outlet, respectively, and plug means having generally axially spaced opposite first and second surfaces positioned in said cavity and said first surface engageable against said support surface, said plug means at least partially extending into said first conduit means, said plug means being formed of non-metallic material, said base means comprising cap means removably mountable and engageable against said second surface for capturing said plug means in said cavity;
    imperforate container means mountable to said base means wherein said container means includes an end portion positioned within said cavity and includes aperture means for receiving said first and second conduit means to provide fluid communication with said base means via said first and second conduit means, said container means having filtering means enclosed therein for filtering fuel which traverses a flow path through said filtering means, a pre-established volume of said plug means being disposed in said container means when said cartridge means is mounted to said base means;

so that when said container means is axially dismounted from said base means, said plug means is withdrawn from said container means defining a free volume in said container means and fuel dischargeable from said base means under the force of gravity falls into said container means and occupies a portion of said free volume for retention thereby.

11. The fuel filter assembly of claim 10 wherein said plug means comprises a positioning shoulder and a central column projecting generally perpendicularly from said positioning shoulder and extending at least partially into said first conduit means.

12. The fuel filter assembly of claim 11 wherein said positioning shoulder further comprises a circular axial positioning rim disposed in said cavity for positioning said column in generally coaxial relationship with said first conduit means.

13. The fuel filter assembly of claim 11 wherein said first surface defines a plurality of grooves which extend generally radially relative to said column to provide fluid communication between said column and the radial periphery of said positioning shoulder.

14. The fuel filter assembly of claim 10 wherein said end portion includes a first surface generally facing said base, said end portion configured to define an annular retaining recess axially recessed relative to said first surface and surrounding said aperture means and positionable to surround said conduit means when said cartridge means is mounted to said base means.

15. A fuel filter assembly comprising:
base means having an axis and comprising an inlet and an outlet, said base means comprising cavity defining means for defining a cavity, and first and second conduit means in fluid communication with said cavity for providing generally axial fluid communication with said inlet and outlet, respectively;

plug means positioned in said cavity and at least partially extending into said conduit means, said plug means comprising a positioning shoulder received by said base means and having a first side and an opposing second side, a central column projecting generally perpendicularly into said conduit means from said positioning shoulder second side, the second side of said positioning shoulder defining a groove extending generally radially relative to said column in fluid communication with said inlet;

imperforate container means mountable to said base means wherein said imperforate container means includes an end portion positioned within said cavity and includes aperture means for receiving said first and second conduit means to provide fluid communication with said base means via said first and second conduit means, said container means having filtering means enclosed therein for filtering fuel which traverses a flow path through said filtering means, a pre-established volume of said plug means being disposed in said container means when said container means is mounted to said base means;

so that when said container means is axially dismounted from said base means, said plug means is withdrawn from said container means defining a free volume in said container means and fuel dischargeable from said base means under the force of gravity falls into said container means and occupies a portion of said free volume for retention thereby.

16. The fuel filter assembly of claim 15 wherein said plug means is symmetric about a central axis thereof.

17. Fuel filter assembly of claim 15 wherein said positioning shoulder defines a plurality of generally radial grooves.

* * * * *

UNITED STATES PATENT AND TRADEMARK OFFICE
CERTIFICATE OF CORRECTION

PATENT NO. : 5,312,546
DATED : May 17, 1994
INVENTOR(S) : Leon P. Janik

It is certified that error appears in the above-indentified patent and that said Letters Patent is hereby corrected as shown below:

Column 7, lines 4-5, change "cartridge" to --container--.

Signed and Sealed this

Nineteenth Day of November, 1996

Attest:

BRUCE LEHMAN

*Attesting Officer*     *Commissioner of Patents and Trademarks*